US010871433B2

(12) United States Patent
Ryu et al.

(10) Patent No.: US 10,871,433 B2
(45) Date of Patent: Dec. 22, 2020

(54) OPTICAL DEVICE FOR QUANTITATIVE DETERMINATION OF THE CONCENTRATION OF AN ANALYTE IN A LIQUID SAMPLE COMPRISING A MASK MEMBER BETWEEN FIRST AND SECOND CHAMBERS

(71) Applicant: MOLECULAR VISION LIMITED, York (GB)

(72) Inventors: Gihan Ryu, York (GB); Gordon Jowett, York (GB); Neeraj Adsul, York (GB)

(73) Assignee: MOLECULAR VISION LIMITED, York (GB)

( * ) Notice: Subject to any disclaimer, the term of this patent is extended or adjusted under 35 U.S.C. 154(b) by 228 days.

(21) Appl. No.: 16/303,820

(22) PCT Filed: May 24, 2017

(86) PCT No.: PCT/GB2017/051446
§ 371 (c)(1),
(2) Date: Nov. 21, 2018

(87) PCT Pub. No.: WO2017/203239
PCT Pub. Date: Nov. 30, 2017

(65) Prior Publication Data
US 2020/0072722 A1 Mar. 5, 2020

(30) Foreign Application Priority Data
May 24, 2016 (GB) .................................. 1609128.2

(51) Int. Cl.
*G01N 15/06* (2006.01)
(52) U.S. Cl.
CPC ..... *G01N 15/06* (2013.01); *G01N 2015/0693* (2013.01)

(58) Field of Classification Search
CPC .......... G01N 21/80; G01N 15/06; G01N 1/10; G01N 2021/7733; G01N 21/8483; B01L 2300/0825; B01L 3/5023
(Continued)

(56) References Cited

U.S. PATENT DOCUMENTS 5,434,084 A * 7/1995 Burgess, Jr. ......... G01N 21/643
356/41
2006/0240541 A1 10/2006 Petruno et al.
2014/0065647 A1 3/2014 Mamenta

FOREIGN PATENT DOCUMENTS

WO 2015/024553 2/2015
WO 2015/121672 8/2015
WO 2017/203240 11/2017

OTHER PUBLICATIONS

International Search Report for PCT/GB2017/051446, dated Jan. 11, 2018, 4 pages.
(Continued)

*Primary Examiner* — Que Tan Le
(74) *Attorney, Agent, or Firm* — Nixon & Vanderhye PC (57) ABSTRACT

An optical device for the quantitative determination of the concentration of at least one analyte in a liquid sample comprises a housing (52) defining a first chamber (56) and a second chamber (60). A sample port (64) is defined in the first chamber (56). The sample port (64) receives light from a plurality of test regions of an assay device when the optical device is engaged with the assay device. The optical device further comprises a plurality of optical detectors (75, 76, 77) provided in the second chamber (60) and a mask member (66) interposed between the first chamber (56) and the second chamber (60) and having an aperture (68) defined therein and configured to direct light from the sample port (64) onto the optical detectors (75, 76, 77).

14 Claims, 4 Drawing Sheets

(58) Field of Classification Search
USPC .................................................. 250/573, 239
See application file for complete search history.

(56) References Cited

OTHER PUBLICATIONS

Combined Search and Examination Report dated Aug. 4, 2016 in related GB Application No. 1609128.2, 7 pages.
International Preliminary Report on Patentability and Written Opinion dated Dec. 5, 2018 in corresponding PCT Application No. PCT/GB2017/051446, 9 pages.

* cited by examiner

OPTICAL DEVICE FOR QUANTITATIVE DETERMINATION OF THE CONCENTRATION OF AN ANALYTE IN A LIQUID SAMPLE COMPRISING A MASK MEMBER BETWEEN FIRST AND SECOND CHAMBERS

This application is the U.S. national phase of International Application No. PCT/GB2017/051446 filed 24 May 2017, which designated the U.S. and claims priority to GB Patent Application No. 1609128.2 filed 24 May 2016, the entire contents of each of which are hereby incorporated by reference.

This invention relates to an optical device for the quantitative determination of the concentration of at least one analyte in a liquid sample using one or more assay devices, each comprising a lateral flow membrane.

BACKGROUND

Our patent application WO2015/121672 discloses assay devices for the quantitative determination of the concentration of at least one analyte in a liquid sample. The present invention, at least in its preferred embodiments aims to provide an alternative to devices of the prior art.

BRIEF SUMMARY OF THE DISCLOSURE

In accordance with the present invention there is provided an optical device for the quantitative determination of the concentration of at least one analyte in a liquid sample, the liquid sample provided in one or more assay devices, each comprising a lateral flow membrane, the assay device(s) providing a plurality of test regions for retaining tagging particles in the plurality of test regions in dependence on the concentration of the analyte in the liquid sample. The optical device comprises a housing defining a first chamber and a second chamber, a sample port defined in the first chamber, the sample port for receiving light from the plurality of test regions of the assay device(s) when the optical device is engaged with the assay device(s), a plurality of optical detectors provided in the second chamber; and a mask member interposed between the first chamber and the second chamber and having an aperture defined therein configured to direct light from the sample port onto the optical detectors.

It will be understood that the device is configured for detecting light from a plurality of test regions simultaneously. The plurality of test regions may be provided on the same lateral flow membrane within a single assay device, or one or more test regions may be provided on different lateral flow membranes within a single assay device. Alternatively, the optical device may be configured to receive multiple assay devices (i.e. two or more assay devices), each of which comprising one or more lateral flow membranes, and each lateral flow membrane comprising one or more test regions.

Thus, in accordance with the present invention a simple optical configuration is provided which can direct light from multiple test regions of one or more assay devices onto optical detectors without requiring a lens. The light from multiple test regions of one or more assay devices may be directed onto one or more optical detectors through a single aperture, without requiring a lens or any other intervening optics between the test regions of the one or more assay devices and the one or more optical detectors. The optical device may comprise only a single aperture through which light is able to pass from the first chamber to the second chamber of the optical device. The first chamber may comprise no optical detectors and the second chamber may comprise no light sources, such that light only enters the second chamber substantially through the single aperture. The invention thus provides for lens-free imaging of multiple lateral flow devices through a single aperture.

The optical device may further comprise an optical emitter arranged to illuminate a test region of the assay device when the assay device is received at the sample port. The optical emitter may be provided in the first chamber. In some embodiments the device comprises two or more optical emitters. The optical emitter(s) may be arranged to illuminate the first chamber with diffuse light. For example, the optical emitter(s) (such as LED(s)) may be directed towards side walls of the first chamber and not directed towards the test regions of the one or more assay devices. The emitter(s) may be arranged to reduce the proportion of light impinging on the optical detector(s) which has not first reflected from a test region of an assay device—i.e. direct pathways from the emitter(s) to detector(s) through the aperture may be reduced or eliminated.

One or more of the plurality of optical detectors may be planar. In some embodiments, each of the plurality of optical detectors is planar. Thus, the device may comprise a plurality of planar optical detectors.

Each of the plurality of optical detectors may be an optical detector array comprising a plurality of optical detector pixels. In one embodiment the plurality of optical detectors is three optical detectors. In some embodiments, the plurality of optical detectors may be physically spaced apart from one another. The plurality of optical detectors may be one of a silicon photodiode array, an organic photodiode array, a CCD, a CMOS image sensor, or a plurality of line sensors spaced laterally apart. The number of line sensors may be equal to the total number of lateral flow membranes, which can be accommodated by a system comprising the optical device. Each line sensor may be a CCD or CMOS sensor having a very high aspect ratio, or even a single row of pixels formed by a plurality of photodiodes arranged in a line, e.g. a sensor which is 100 pixels long and 1 pixel wide. The line sensors may be oriented substantially parallel to the lateral flow membranes, i.e. perpendicular to the lines on the assay device formed by the test regions. In an example, if the optical device is arranged to be used in a system in conjunction with a maximum of three lateral flow devices spaced apart laterally, the optical device may have three line sensors spaced apart laterally, wherein the aperture is located substantially vertically above the middle one of the three lateral flow devices and substantially vertical below the middle one of the three line sensors, such that each line sensor can receive light substantially only from a respective one of the lateral flow devices under illumination. The inventors have appreciated that if only a single, compact/small planar CCD were used, instead of e.g. three separate spaced-apart line sensors (in the case of three lateral flow devices), the separation between the lateral flow devices and the aperture would have to be increased in order that all test regions could be imaged onto the compact/small CCD sensor without significant corruption owing to e.g. crosstalk. However, the inventors have appreciated that this would result in an optical device which is far greater in size—owing to the increased separation required between the aperture and the assay device(s)—and would also require the illumination intensity to be significantly increased—which would result in higher power consumption of the optical device and potential degradation of the samples through greater exposure to light. Accordingly, the inventors have appreciated that it is desirable to provide a plurality of spaced-apart detectors, such as a plurality of line sensors, instead of a single planar detector, such as a CCD. This is because the inventors appreciate that a compact/small CCD would have the disadvantages mentioned above (e.g. requiring greater illumination intensity in the first chamber, a larger separation between the aperture and lateral flow device, and/or the inclusion of a lens), whilst a larger CCD, e.g. having a width equivalent to the total span of the spaced-apart line sensors, would be uneconomical. The inventors have appreciated that since the slit-shaped aperture effectively integrates the light contribution from each test region, it is not necessary to use a 2D sensor such as a conventional CCD, since no further information would be obtained in the direction parallel to the lines of the test regions of the lateral flow devices.

In embodiments of the invention, the width of the aperture may be between 0.1 millimetres and 0.4 millimetres. The length of the aperture may be between 1 millimetre and 3 millimetres. The aperture may be located substantially centrally between the plurality of optical detectors. The length of the aperture may thus be greater than the width of the aperture and the length-wise direction of the aperture may be substantially perpendicular to a length-wise direction of the optical detector(s), i.e. perpendicular to the line sensor(s). Further, the length-wise direction of the aperture may be substantially perpendicular to the lateral flow membrane(s) of the assay device(s), e.g. parallel to the individual test lines of the lateral flow membrane(s). In this manner, the aperture effectively integrates the light contribution from across each test line. The opposite relative orientation between the length-wise direction of the aperture and the optical detector(s)/lateral flow membranes may be beneficial depending on the exact configuration of the assay devices.

The first chamber may be provided with a light reflective, for example white, inner surface. By making the inner surface of the first chamber white, the first chamber acts as a 'light integrating sphere', resulting in a much higher light throughput. In effect, the first chamber acts in a manner which is broadly similar to that of an integrating sphere, in which the light impinges on the surfaces at a genuinely random angle of a known distribution. Whilst the light distribution in the first chamber will differ to some extent depending upon the geometry of the chamber, any differences will be relatively slight, and a substantial portion of light will be internally reflected and effectively 'bounce around' inside the chamber, in a diffuse fashion. The overall result is that the amount of light illuminating the test region is enhanced. This leads to more reproducible results.

The amount of light received by the detector is sufficient to provide a detectable signal, without the need for incorporating a lens in the device. The absence of a lens means that the problem of unwanted light scatter caused by dust interacting with a lens and image distortion caused by the lens aberration are avoided. Furthermore, omission of the lens reduces component and manufacturing costs and make the construction simple and robust with respect to handling. The few components means that the device may be compact and easy to use.

The first chamber may be made of any rigid white plastic material such as Nylon, Acrylonitrile Butadiene Styrene (ABS) or Acetal.

The optical emitter (source of illumination) in said first chamber may be any light source such as a light emitting diode (LED), halogen lamp, organic light emitting diode (OLED) or laser diode (LD). The light source such as the LEDs may be white or may be coloured. This will depend upon the particular arrangement within the lateral flow device and in particular, the sort of label used in the assay system. Thus the LEDs may be for example, green, blue or red depending upon the nature of the colour of the line. Thus for example, for use in conjunction with a lateral flow device that utilises gold nanoparticles which generate reddish lines, as the labelling system, it may be advantageous to utilise a green LED to maximise the signal received by the detector.

Uniform illumination of the test region is an important factor for better signal quality and so two or more light sources surrounding assay device may be a better configuration than a single light source.

The aperture between the first and second chambers may take the form of a pin-hole opening but in particular embodiments is in the form of a slit. A slit allows the device to efficiently detect a line signal such as that generated by a lateral flow device. In effect, the slit allows for averaging of the signal across the width of the strip.

In the absence of a lens, light has a clear path through the aperture to the detector. Any irregularities in the shape of the aperture can be minimised by creating the aperture using a precise process such as a chemical etching, a laser cutting or a press punching process.

Suitably the slit is from 0.05 mm to 0.5 mm wide and in particular from 0.1 mm to 0.3 mm wide in order to produce a clear image of a line at the detectors.

The length of the slit will depend upon the dimensions of the line signal produced by the assay device. Furthermore, in case of multiple detector arrays in the said second chamber, cross-talk between neighbour lateral flow membranes should be considered. Typically the length of the slit will be in the range of from 0.1 mm to 5 mm, more preferably in the range of 1-3 mm and most preferably about 2 mm.

Since there is no need to consider lens aberrations in the device of the present invention, it may be designed such that the distance between the aperture and the signal being read on the assay device(s) and the distance between the aperture and the detector only follows simple ray optics. For example, if the detector's active length (e.g. the length of the line sensor) and the assay device's signal window are the same dimension then their distances will be the same and if the detector's active length is a half of the assay device's signal window dimension then the distance between the aperture and the detector is a half of the distance of the aperture and the signal being read on the assay device. The distance across the first chamber from the sample port to the aperture and the distance across the second chamber from the aperture to the detector may be for example in the range of 5-100 mm, more preferably in the range of 10-50 mm and the most preferably in the range of 10-30 mm.

The second chamber is suitably provided with a non-reflective inner surface, and in particular a black inner surface so as to avoid spurious and/or stray light.

The dimensions of the second chamber may be relatively small as described above in order to ensure that the overall device remains compact.

The second chamber may be made of any rigid black plastic material such as Nylon, Acrylonitrile Butadiene Styrene (ABS) or Acetal.

The optical detector provided in the second chamber may be any suitable photodetector including for example a silicon photodiode array, a complementary metal-oxide semiconductor (CMOS), a charge coupled devices (CCD) or an organic photo diode (OPD).

The optical device may comprise a holder for receiving one or more assay devices, each device containing at least one lateral flow membrane. The holder may be removably secured in the optical device to enable the assay devices to be loaded and unloaded. Further, the holder may be entirely replaceable/adaptable such that the optical device can be adapted to enable operation with different assay device geometries or different numbers of assay devices, for example enabling simultaneous measurement on a greater number of separate assay devices. The assay devices may be held in the holder by any convenient means, such as a push-fit. When secured in the optical device the holder ensures correct relative mutual alignment of each of the assay device (and therefore the test regions), aperture and detector. The holder itself may be a drawer which can be opened to load/unload assay devices and closed during measurement or standby of the optical device. Alternatively, the holder may take the form of a removable insert which is placed on a drawer of the optical device. The drawer may comprise one or more springs to ensure that the assay devices are retained in a constant position during measurement.

In some embodiments, the sample port is adjacent to a top surface of the holder which is exposed to light from the one or more emitters and effectively imaged, by means of the aperture, onto the one or more optical detectors, when the holder is inserted in the optical device.

An assay device may take the form of a cartridge. A first type of holder may be configured to receive three separate cartridges, each cartridge being a separate assay device having one lateral flow membrane. Alternatively, a second type of holder may be configured to receive one cartridge having three lateral flow membranes on it, i.e. a single assay device for performing three separate assays on a single sample. Alternatively, a third type of holder may be configured to receive two cartridges, each having one lateral flow membrane. The inventors have appreciated that a single optical device having three laterally spaced apart optical detectors would be suitable for use with each of the first, second or third type of holders—such that the main optical components of the optical device are invariant—thereby enabling operational flexibility.

It will be appreciated that the assay device itself does not form a part of the optical device of the first aspect of the invention.

According to a second aspect of the invention, there is provided a system for the quantitative determination of the concentration of at least one analyte in a liquid sample, the system comprising:
an optical device according to the first aspect of the invention; and
one or more assay devices, each assay device comprising a lateral flow membrane, wherein the one or more assay devices provide a plurality of test regions for retaining tagging particles in the plurality of test regions in dependence on the concentration of the analyte in the liquid sample.

The assay device may comprise a lateral flow membrane, a conjugate pad in fluid communication with a proximal end of the lateral flow membrane, the conjugate pad comprising optically detectable tagging particles bound to a first assay component, and a wicking pad in fluid communication with a distal end of the lateral flow membrane. The lateral flow membrane is capable of transporting fluid from the conjugate pad to the wicking pad by capillary action. The lateral flow membrane comprises at least one test region comprising an immobilised second assay component for retaining the tagging particles in the test region in dependence on the binding between the analyte, the first assay component and the second assay component in order to generate a concentration of tagging particles in the test region that is indicative of the concentration of the analyte in the liquid sample.

At least one of the test regions may be in the shape of a substantially rectangular line. Alternatively, at least one of the test regions may be a circle, square or dot. It will be appreciated that the test regions may be supplied in any conceivable shape fitting within the boundary of the lateral flow membrane.

In an embodiment of the assay device, the tagging particles absorb light at a wavelength emitted by the emitter, and the detector is arranged to detect light from the emitter passing through the lateral flow membrane, whereby the attenuation of the light intensity detected by the detector due to absorption by the immobilised tagging particles is indicative of the concentration of the analyte in the liquid sample. For example, the tagging particles may be gold nanoparticles which appear red when concentrated and may be illuminated by green light from the illumination source. As a further example, the tagging particles may be blue polystyrene particles and may be illuminated by red light from the illumination source. The light from the illumination source may be in the visible spectrum, but could also be in the ultraviolet or infra red wavelength ranges.

The lateral flow membrane may be formed from a light transmissive material. The lateral flow membrane material may be nitrocellulose and may have a thickness of less than 200 microns, preferably less than 150 microns, more preferably less than 100 microns.

The assay device may further comprise a sample pad in fluid communication with the conjugate pad and arranged to receive the liquid sample. The conjugate pad may perform the role of a sample pad, where no distinct sample pad is provided.

The lateral flow membrane may comprise a control region. The control region may be positioned between the test region(s) and the distal end of the lateral flow membrane, the control region may comprise an immobilised control component for retaining tagging particles in the control region.

The first assay component may comprise a molecule which binds the analyte to the tagging particles and the second assay component may comprise a receptor for the analyte. This combination of components is useful in a sandwich assay.

The first assay component may comprise the analyte or an analogue thereof and the second assay component may comprise a receptor for the analyte. This combination of components is useful in a competitive assay. Alternatively, the first assay component comprises a receptor for the analyte and the second assay component comprises the analyte or an analogue thereof. The assay may be an immunoassay. The receptor may be an antibody which binds to the analyte or an analogue thereof.

In accordance with an embodiment of the invention, the system comprises a first assay device and at least a second assay device, wherein the second assay device is arranged in parallel with the first assay device. The first and second assay devices may be arranged under the first chamber.

Thus, a second assay device allows multiple assay tests to be performed in parallel. In some embodiments, the multiple assay tests may be testing for the same analyte in the same way. Alternatively, the multiple assay tests may be testing for different analytes. Performing assay tests in parallel prevents the mechanism of one assay test interfering with the mechanism of a second assay test.

BRIEF DESCRIPTION OF THE DRAWINGS

Embodiments of the invention are further described hereinafter with reference to the accompanying drawings, in which.

DETAILED DESCRIPTION

Figure 1:
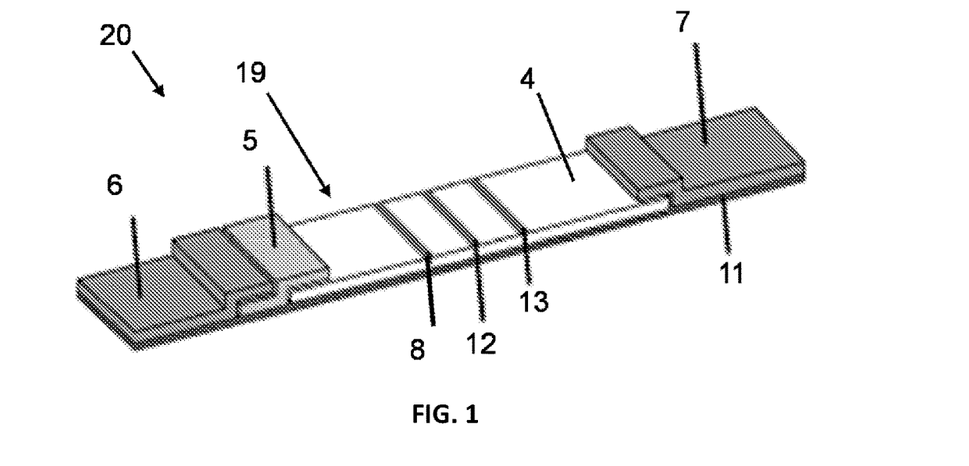
FIG. 1 is a schematic view of an assay device for use with an optical device according to an embodiment of the present invention.

FIG. 1 shows an illustration of an assay device 20 for use with an optical device according to an embodiment of the present invention. The assay device 20 takes the form of a cartridge for insertion into a cartridge reader and comprises a sample pad 6, in fluid communication with a conjugate pad 5. The conjugate pad 5 contains particle tags which are capable of binding to an assay component. A lateral flow membrane 4 is connected between the conjugate pad 5 and a wicking pad 7. When a sample is deposited on the sample pad 6, a reservoir of excess sample is formed. The excess sample migrates to the conjugate pad 5. This migration is first caused by the conjugate pad 5, then the wicking action of the lateral flow membrane 4 and then additionally the wicking pad 7. The conjugate pad 5 contains analyte tags. The analyte tags bind to the corresponding available analyte. Capillary action causes the liquid sample, containing any tagged analyte, to flow down the lateral flow membrane 4 from the conjugate pad 5 into the testing area 19 towards the wicking pad 7. Before the sample reaches the wicking pad 7, it encounters a test region in the form of a reaction line 8 containing fixed receptors for the analyte. When the tagged analyte reaches this point, the receptors bind to the analyte, holding the analyte and the tags in place. The presence of the coloured analyte tag will cause the reaction line 8 to change colour as the concentration of the tags increases. In the presently described example, the concentration of the coloured tags is a direct indicator of the concentration of analyte at the reaction line which provides an indication of the concentration of the analyte in the liquid sample.

The above is an example of a sandwich assay technique. A competitive assay is also possible in which the intensity of the response from a further test region in the form of a further reaction line 12 (usually a colour) is inversely proportional to the amount of analyte present in the sample. In one example of this technique, the conjugate pad 5 additionally contains a pre-tagged second analyte or analyte analogue. The analyte from the sample passes unchanged through the conjugate pad 5, and will bind to the receptors on the further reaction line 12, occupying receptor sites to which the pre-tagged analytes or analyte analogues would otherwise bind. The less analyte there is in the sample, the more pre-tagged analyte or analyte analogue is able to bind to the receptors, resulting in a stronger colouring of the line. In a further example of this technique, the conjugate pad 5 could also or instead contain a tagged receptor. In this case fixed analyte or analyte analogue is immobilised on a reaction line. The more analyte present in the sample, the more of the tagged receptor that will bind to the analyte from the sample, and so not be available to bind to the fixed analyte or analyte analogue. The competitive assay technique may be used to qualitatively test for the absence of a particular analyte, though is not a purely binary test, and a very small amount of analyte in the sample is still likely to result in binding of the pre-tagged molecule (be that analyte, analyte analogue or receptor) at the position of the line. The competitive assay technique may instead be used to quantitatively indicate the concentration of a particular analyte in the liquid sample.

There is also another test region in the form of a further line 13 of control receptors on the lateral flow membrane 4 which react with the tagged component itself. The control line 13 contains immobilised receptors which bind to the tagged component. The control line 13 should become coloured whenever the test is carried out, regardless of whether the sample contains any analyte. This helps confirm the test is performing correctly. In the presently described example, the reaction line 8 only changes colour when the analyte is present in the sample. In embodiments with multiple assays, there may be multiple control lines. In this way, the control lines can be used to determine whether each test to be performed by the lateral flow device has been performed. The control line 13 in the current example is provided downstream of the earlier reaction lines. By providing the control line 13 downstream of the reaction lines, the analyte tag must flow through the other reaction lines before they can bind to the control line indicating that a test has been carried out.

In the present case, the lateral flow membrane 4 is approximately 100 μm microns thick and the reaction lines 8, 12 and control line 13 are each 1.0 mm×5.0 mm with a 4.0 mm gap between them. In examples, the lateral flow membrane may be formed from a light-transmissive material such as nitrocellulose. The sample pad 6, conjugate pad 5, lateral flow membrane 4 and wicking pad 7 may be provided on a transparent substrate 11. In other examples, the sample pad 6, conjugate pad 5, lateral flow membrane 4 and wicking pad 7 may be provided on an opaque substrate.

A range of different tags and receptor lines can be used to determine the presence, absence, or concentration of multiple different analytes. The presence of some analytes may be tested in combination with the absence of different, or the same, analytes. Tests for example assays are described in our patent application WO2015/121672. Example labelling particles include gold nano-particles, coloured latex particles, or fluorescent labels. It will also be understood that different numbers and/or configurations of test regions in the form of reaction lines or control lines may be envisaged by the present disclosure.

Whilst common household assay tests, such as some pregnancy tests, have an apparently binary result and require a user to manually interpret the results, the assay device may use an optical device in the form of a cartridge reader as will be described hereinafter and having a light source and a light detector to measure the light absorption as a result of the analyte test. Whilst the presently described example uses the absorption of light by a substance to indicate the concentration of an analyte in a test sample, embodiments can equally be envisaged where the tag on the analyte is luminescent and emits light itself, either as a result of fluorescence, phosphorescence, or as a result of a chemical or electrochemical reaction.

Figure 2A:
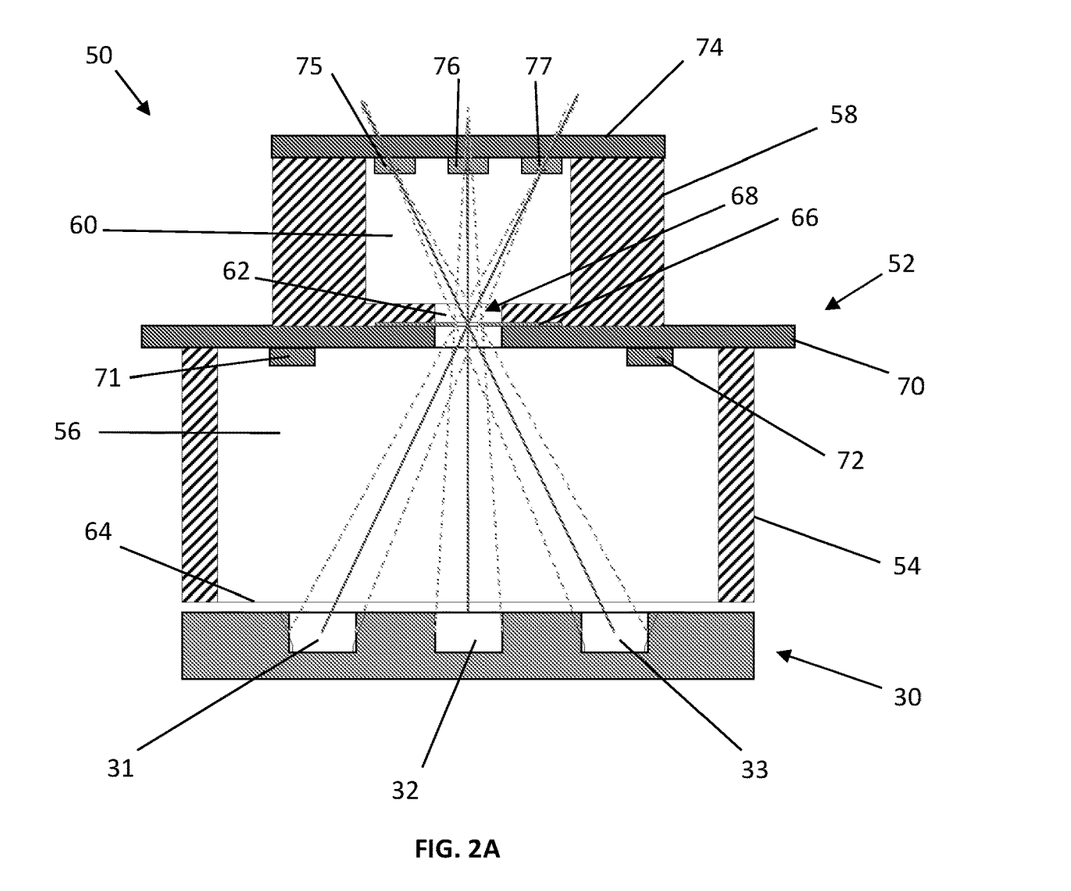
FIG. 2A is an illustration of an optical device according to an embodiment of the present invention.

FIG. 2A shows an optical device for quantitative determination of the concentration of at least one analyte in a liquid sample provided on an assay device as described previously. The optical device 50 is in accordance with an embodiment of the present invention. The optical device 50 comprises a housing 52 having a first portion 54 defining a first chamber 56 and a second portion 58 defining a second chamber 60. The first chamber 56 is connected to the second chamber 60 by an optical passageway 62 between a distal end of the first chamber 56 and a proximal end of the second chamber 60. The first chamber 56 is provided with an opening in the form of a sample port 64 at a proximal end thereof. The sample port 64 is for receiving light from reaction lines 8, 12 and control line 13 of assay device 20 when the assay device 20 is engaged with the optical device 50 as described previously. An internal surface of the first portion 54 of the housing 52 is of a substantially white colour. In this way, an internal surface of the first chamber 56 is substantially white. In this embodiment, the first portion 54 of the housing 52 is formed from a white plastics material. An internal surface of the second portion 58 of the housing 52 is of a substantially black colour. In this way, an internal surface of the second chamber 60 is substantially black. In this example, the second portion 58 of the housing 52 is formed from a substantially non-reflective black plastics material. The optical passageway 62 comprises a mask layer 66 having defined therein an aperture 68. The aperture 68 in this example has a width of 0.2 millimetres and a length of 2 millimetres. The aperture 68 facilitates the passage of light from the first chamber 56 to the second chamber 60. In this example, the distal end of the first chamber 56 is defined by an emitter printed circuit board (PCB) 70 having mounted thereto an illumination source in the form of two light-emitting diodes (LEDs) 71, 72. It will be understood that the illumination source may be provided by any number of LEDs, for example more than two LEDs. The LEDs 71, 72 are mounted on the emitter PCB 70 symmetrically about the optical passageway 62 (and the aperture 68). A distal end of the second chamber 60 is defined by a detector PCB 74 having mounted thereto a plurality of detectors in the form of a left photodiode array 75, a middle photodiode array 76 and a right photodiode array 77. In an example, the photodiode arrays may be silicon photodiode arrays. The three photodiode arrays 75, 76, 77 are arranged in parallel with a periodicity of 4.7 millimetres. In this example, each photodiode array 75, 76, 77 comprises 1×128 pixel arrays, having an active region of approximately 64 micrometres×8 millimetres.

An overall height of the optical device 50 from the proximal end of the first chamber 56 to the distal end of the second chamber 60 is approximately 35 millimetres, making the optical device 50 compact and easy to transport.

In use, the sample port 64 of the optical device 50 is placed adjacent to an assay device 30. The assay device 30 comprises a left lateral flow membrane 31, a middle lateral flow membrane 32 and a right lateral flow membrane 33, each comprising one or more test regions as described previously. The optical device 50 is aligned with the assay device 30 such that the lateral flow membranes 31, 32, 33 are centred in the sample port 64 provided at the proximal end of the first chamber 56. In use, light from the LEDs 71, 72 may illuminate substantially the whole of the first chamber 56 diffusely. In this way, the lateral flow membranes 31, 32, 33 are illuminated from a plurality of different directions. A portion of the light reflected by each of the lateral flow membranes 31, 32, 33 is reflected back into the first chamber 56 and directly through the aperture 68 defined within the mask layer 66. Each photodiode array 75, 76, 77 is located such that the portion of light passing through the aperture 68 after reflection at the respective lateral flow membranes 31, 32, 33 impinges on the respective photodiode array 75, 76, 77. The signal generated by each photodiode array 75, 76, 77 may then be analysed to determine an indication of a quantitative concentration of an analyte in a liquid sample provided to the assay device 30.

In one example, the optical device is arranged to be operated with an assay device having three lateral flow membranes. The lateral flow membranes 31, 32, 33 are spaced having a period of 10.5 millimetres in a direction in a plane of the lateral flow membranes and transverse to a flow direction on the lateral flow membranes 31, 32, 33. In use, a portion of light reflected from the middle lateral flow membrane 32 passes through the aperture 68 and impinges on the middle photodiode array 76. Due to the small width of the aperture 68, and the spacing between the photodiode arrays 75, 76, 77 the light reflected from the middle lateral flow membrane 32 cannot reach either of the left photodiode array 75 or the right photodiode array 77. Similarly, light reflected from the left lateral flow membrane 31 impinges on the right photodiode array 77 and does not impinge on either of the left photodiode array 75 or the middle photodiode array 76. Light reflected from the right lateral flow membrane 33 impinges on the left photodiode array 75 and does not impinge on either of the middle photodiode array 76 or the right photodiode array 77.

To reduce stray light from the LEDs 71, 72 impinging on any of the photodiode arrays 75, 76, 77 without reflecting on the respective lateral flow membranes 31, 32, 33 the LEDs 71, 72 may be configured to emit light diffusely. In an example, the LEDs 71, 72 may be directed towards a side wall of the first chamber 56. In this way, the proportion of light impinging on the photodiode arrays 75, 76, 77 and not originating from a reflection on the respective lateral flow membranes 31, 32, 33 may be reduced. This prevents saturation of the photodiode arrays 75, 76, 77 with high levels of background illumination whilst maintaining an accuracy of the optical device 50.

Figure 2B:
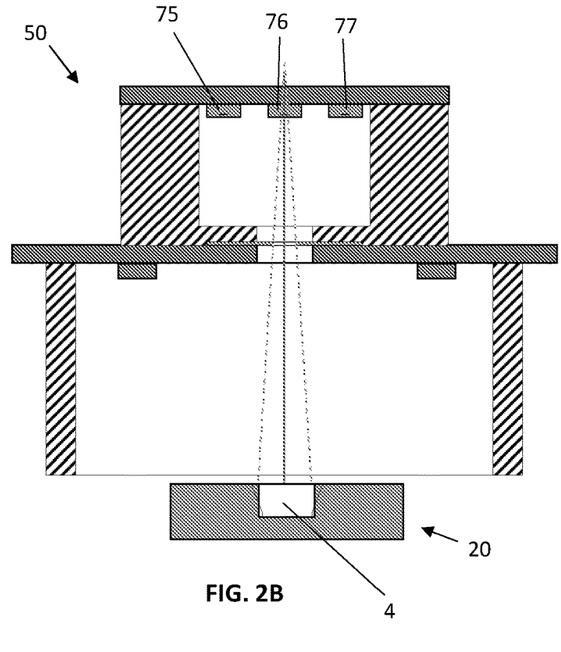
FIG. 2B is an illustration of an optical device according to an embodiment of the present invention.
Figure 2C:
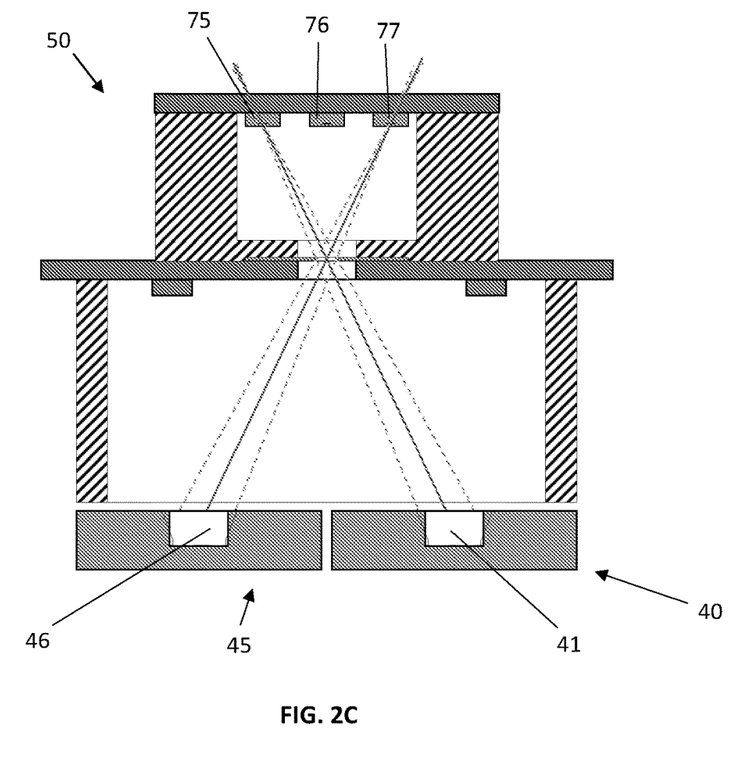
FIG. 2C is an illustration of an optical device according to an embodiment of the present invention.

FIGS. 2B and 2C are illustrations of further examples of the use of the optical device 50. Without changing a configuration of the optical device 50 it is easy to use the optical device 50 on a number of different assay device cartridges. In one example, as shown in FIG. 2B, the optical device 50 can be used with an assay device cartridge 20 having a single lateral flow membrane 4 provided thereon. The assay device cartridge 20 is positioned in a central location beneath the sample port 64. In this way, reflection from the lateral flow membrane 4 only impinges on the middle photodiode array 76. A further example is shown in FIG. 2C. In this example, two assay device cartridges 40, 45 can each be provided with a single lateral flow membrane 41, 46. The lateral flow membranes 41, 46 can each be analysed using the left photodiode array 75 and the right photodiode array 77 respectively. The two lateral flow membranes 41, 46 may be a duplicated analyte test, a test for the same analyte but configured for different concentration ranges or two different analyte tests.

Figure 3A:
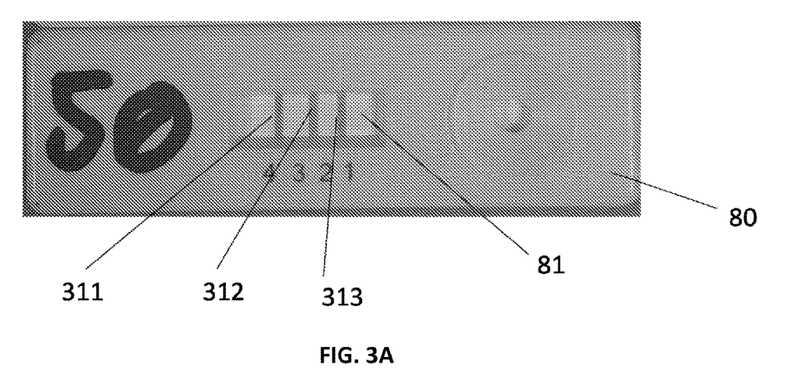
FIG. 3A is an illustration of a lateral flow device for use with an optical device according to an embodiment of the present invention.

To analyse the test region(s) of lateral flow membrane(s) on an assay device, a set of reference detection values indicative of a response of each photodiode array can be obtained using a blank assay device (not shown). The reference detection values can be stored in a storage area electrically connected to the optical device 50. Following this, an assay device having had a liquid sample applied thereto is analysed by the optical device 50 and the raw detection values indicative of the response of each photodiode array are obtained. The difference between the raw detection values and the reference detection values is determined by a controller comprising a processor. FIG. 3A is an illustration of an example of an assay device 80 having a lateral flow membrane 81 provided thereon and suitable for use with an optical device as described herein. The assay device 80 in this example is a replica assay device for illustration purposes. The lateral flow membrane 81 comprises a test line-1 313, a test line-2 312 and a control line 311.

Figure 3B:
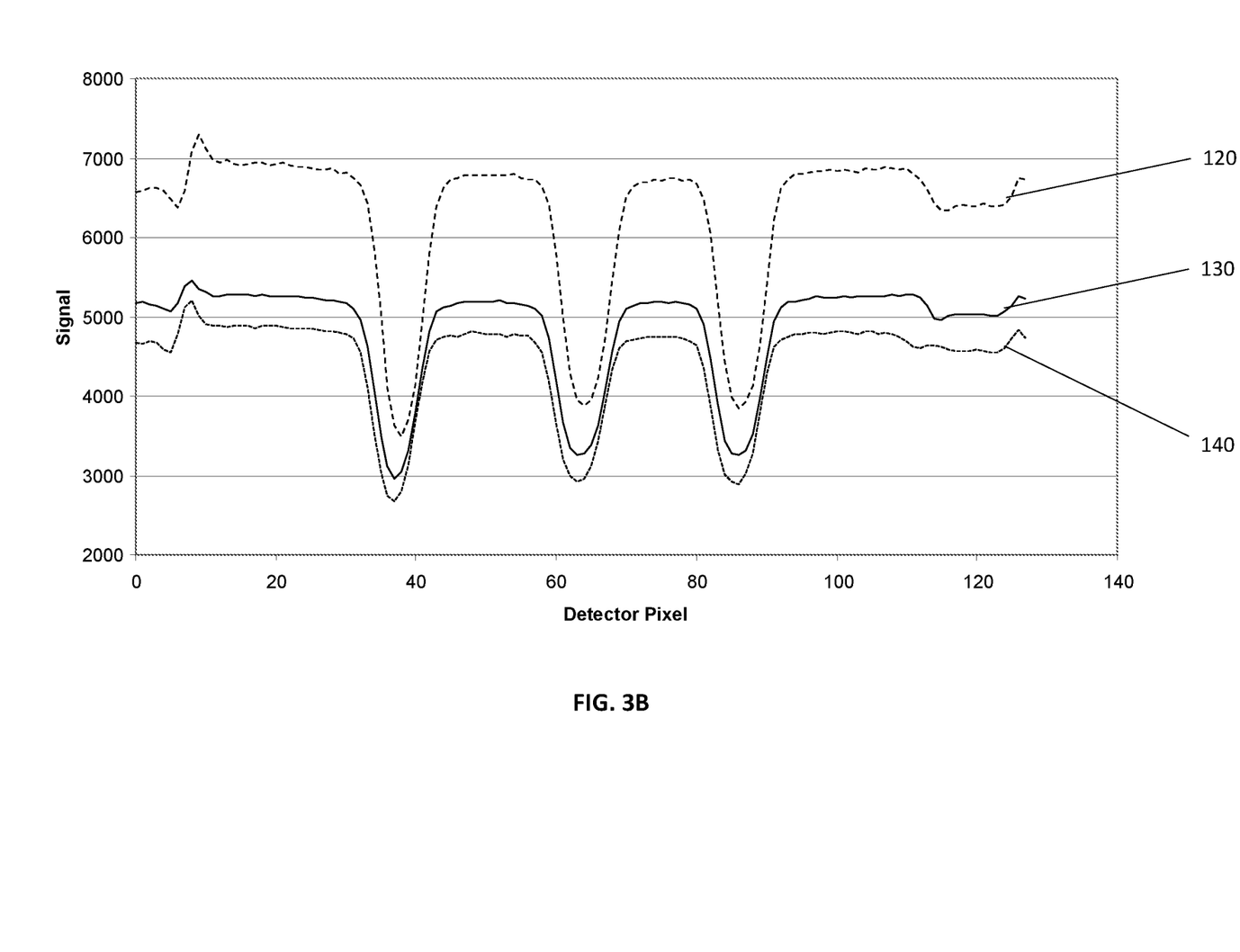
FIG. 3B is an illustration of measured signal data from the lateral flow device of FIG. 3A using an optical device according to an embodiment of the present invention.

FIG. 3B is a graph showing the reference detection values from a blank assay device subtracted from the raw detection values determined by using the optical device 50 on the assay device 80 of FIG. 3A. The dashed line curve 120 is indicative of a signal measured by the middle photodiode array 76 (corresponding to lateral flow membrane 32 in FIG. 2A), the solid line curve 130 is indicative of a signal measured by the left photodiode array 75 (corresponding to lateral flow membrane 33 in FIG. 2A) and the dotted line curve is indicative of a signal measured by the right photodiode array 77 (corresponding to lateral flow membrane 31 in FIG. 2A). Although the three curves are read from the lateral flow membrane 81, the absolute signal intensities are different due to variations in the calibration of each photodiode array 75, 76, 77. However, three dips can be observed which correspond to each of the lines 311, 312, 313 on the lateral flow membrane 81 on assay device 80 of FIG. 3A.

Figure 4:
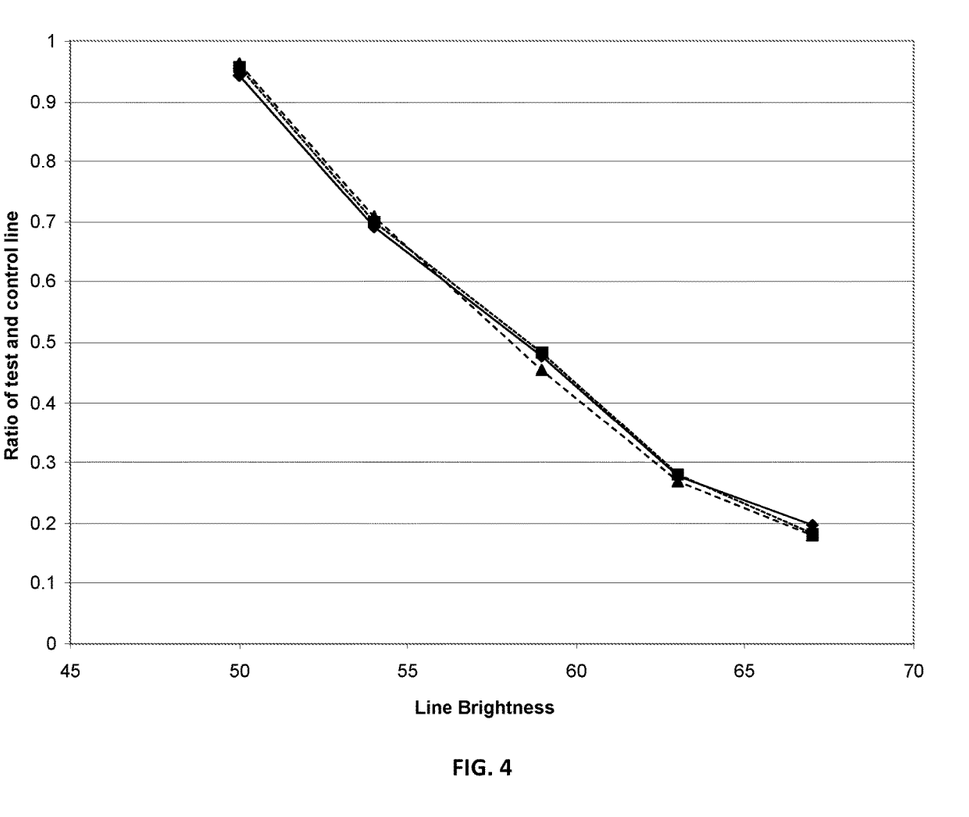
FIG. 4 is an illustration of a graph showing the ratio of response values for test and control lines on an lateral flow device (LFD), measured using an optical device according to an embodiment of the present invention.

Whilst the measured values for each of the three curves in the graph shown in FIG. 3B are different in their absolute intensities, the ratios of a test line to the control line 311 are substantially the same for each different photodiode array (within a tolerance range) as shown by the graph in FIG. 4. FIG. 4 shows the ratio of a test line to the control line for 5 different samples, each having lines of different intensity. The calculated ratio from three photodiode arrays are nearly identical. Therefore, any of the photodiode arrays can be used to determine an indication of the reflections from a test region on a lateral flow membrane of an assay device cartridge, whilst maintaining comparability of the resulting determined analyte concentrations.

In summary, an optical device for the quantitative determination of the concentration of at least one analyte in a liquid sample comprises a housing 52 defining a first chamber 56 and a second chamber 60. A sample port 64 is defined in the first chamber 56. The sample port 64 receives light from a plurality of test regions of one or more assay devices when the optical device is engaged with the assay device(s). The optical device further comprises a plurality of optical detectors 75, 76, 77 provided in the second chamber 60 and a mask member 66 interposed between the first chamber 56 and the second chamber 60 and having an aperture 68 defined therein and configured to direct light from the sample port 64 onto the optical detectors 75, 76, 77.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. An optical device for the quantitative determination of the concentration of an analyte in a liquid sample, the liquid sample provided in one or more assay devices, each comprising a lateral flow membrane, the one or more assay devices providing a plurality of test regions for retaining tagging particles in the plurality of test regions in dependence on the concentration of the analyte in the liquid sample, the optical device comprising:
   a housing defining a first chamber and a second chamber;
   a sample port defined in the first chamber, the sample port for receiving light from the plurality of test regions of the assay device(s) when the optical device is engaged with the assay device(s);
   a plurality of optical detectors provided in the second chamber; and
   a mask member interposed between the first chamber and the second chamber and having an aperture defined therein configured to direct light from the sample port onto the optical detectors.

2. An optical device as claimed in claim 1, further comprising an optical emitter arranged to illuminate a test region of the assay device(s) when the assay device(s) is (are) received at the sample port.

3. An optical device as claimed in claim 2, wherein the optical emitter is provided in the first chamber.

4. An optical device as claimed in claim 1, wherein each of the plurality of optical detectors is an optical detector array comprising a plurality of optical detector pixels.

5. An optical device as claimed in claim 1, wherein the plurality of detectors is three optical detectors.

6. An optical device as claimed in claim 1, wherein each of the plurality of optical detectors is one of a silicon photodiode array, an organic photodiode array, a CCD and a CMOS image sensor.

7. An optical device as claimed in claim 1, wherein the device does not comprise a lens.

8. An optical device as claimed in claim 1, wherein the mask has a single aperture defined therein.

9. An optical device as claimed in claim 1, wherein the plurality of optical detectors are physically spaced apart from one another.

10. An optical device as claimed in claim 1, wherein a width of the aperture is between 0.1 millimetres and 0.4 millimetres.

11. An optical device as claimed in claim 1, wherein a length of the aperture is between 1 millimetres and 3 millimetres.

12. An optical device as claimed in claim 10, wherein the aperture is located substantially centrally between the plurality of optical detectors.

13. An optical device as claimed in claim 1, wherein the optical emitter(s) are directed towards side walls of the first chamber and not directed towards the test regions of the one or more assay devices.

14. A system for the quantitative determination of the concentration of at least one analyte in a liquid sample, the system comprising:
   an optical device according to claim 1; and
   one or more assay devices, each assay device comprising a lateral flow membrane, wherein the one or more assay devices provide a plurality of test regions for retaining tagging particles in the plurality of test regions in dependence on the concentration of the analyte in the liquid sample.

* * * * *